United States Patent [19]
Worbois

[11] 3,985,401
[45] Oct. 12, 1976

[54] APPARATUS FOR VARYING THE TIME BETWEEN INITIATION AND SUBSEQUENT RELEASE OF AN EMERGENCY BRAKE APPLICATION

[75] Inventor: Robert J. Worbois, North Huntingdon, Pa.

[73] Assignee: Westinghouse Air Brake Company, Wilmerding, Pa.

[22] Filed: Oct. 31, 1975

[21] Appl. No.: 627,535

[52] U.S. Cl. ................................ 303/85; 303/9; 303/57
[51] Int. Cl.² ........................................ B60T 11/26
[58] Field of Search .................. 303/3, 8, 9, 13, 28, 303/33, 37, 38, 57, 69, 80, 85, 86

[56] References Cited
UNITED STATES PATENTS

| | | | |
|---|---|---|---|
| 2,113,649 | 4/1938 | Donovan | 303/9 |
| 2,273,952 | 2/1942 | Gorman | 303/57 |
| 2,379,308 | 6/1945 | McClure | 303/85 |
| 2,958,561 | 11/1960 | May | 303/8 |

*Primary Examiner*—Duane A. Reger
*Attorney, Agent, or Firm*—W. F. Poore; R. W. McIntire, Jr.

[57] ABSTRACT

Apparatus for varying the time between the initiation and subsequent release of an emergency brake application on a locomotive and train of cars hauled thereby comprises either fluid pressure operated valve means operable, by fluid under pressure supplied for causing knockout of the locomotive power supply, to establish communication between two reservoirs, separably charged from the train brake pipe, whereby substantially all of the fluid under pressure must be released from both reservoirs to atmosphere via a first restricted communication prior to the release of an emergency application thereby increasing the time between initiating the emergency application and the subsequent release, or fluid pressure operated valve means operably responsively to power knockout to establish another restricted communication between a single reservoir and atmosphere whereby substantially all of the fluid under pressure must be released from the single reservoir to atmosphere via the two restricted communications simultaneously prior to the release of an emergency application thereby decreasing the time between initiating the emergency application and the subsequent release thereof.

10 Claims, 4 Drawing Figures

APPARATUS FOR VARYING THE TIME BETWEEN INITIATION AND SUBSEQUENT RELEASE OF AN EMERGENCY BRAKE APPLICATION

BACKGROUND OF THE INVENTION

The time required to bring a train to a stop subsequent to initiating an emergency brake application thereon is dependent upon both the speed and the weight, and therefore the length, of the moving mass. Usually the brake apparatus provided on a locomotive used to haul a long, heavy freight train at a comparatively low speed is substantially the same as that provided on a locomotive used to haul a short train, such as a passenger train, at a high speed. Therefore, it is apparent that the addition of a simple and inexpensive means to the presently provided locomotive brake apparatus whereby the time between the initiation and subsequent release of an emergency brake application may be selectively increased or decreased as desired would be most welcomed by the railroad industry.

Moreover, certain railroads, in making up a train of cars, may put most or all of the empty cars in the front half of the train next to the locomotive and most or all of the loaded cars in that half of the train that is most remote from the locomotive. These empty cars in the front half of the train are provided with a higher braking ratio than the loaded cars in the remainder of the train. Therefore, whenever an emergency brake application is effected, as a result of a break-in-two of the train, these empty cars are decelerated at a faster rate than the loaded cars. Accordingly, it is apparent that these loaded cars will collide with the empty cars so that these loaded cars may possibly cause damage to the empty cars nearest the locomotive if this collision is too severe. It is apparent that this impact of collision, subsequent to a break-in-two of the train, could be reduced if the brake application were promptly released on that portion of the train between the point of break-in-two and the locomotive. Hence, it can be appreciated that these certain railroads that operate trains having a number of empty cars in the first half of their trains and a number of loaded cars in the remainder would look with favor upon any simple and inexpensive addition to presently used brake apparatus that enables a reduction in the time between initiating an emergency brake application and the subsequent release thereof whereby, upon the occurrence of this brake release on the empty cars in the front half of the train, the locomotive would be rendered effective to pull these empty cars away from the loaded cars thereby reducing the impact of collision and therefore, the possible damage resulting therefrom.

Accordingly, it is the general purpose of this invention to provide, by the addition of simple and inexpensive devices to presently used locomotive brake control apparatus, for either increasing or decreasing, as desired, the time between the initiation and subsequent release of an emergency brake application on a locomotive and a train of cars hauled thereby.

SUMMARY OF THE INVENTION

According to the present invention, the usual brake control apparatus provided on locomotives is modified by the addition of valve means, operated by the fluid under pressure supplied for causing knockout of the locomotive power supply upon effecting an emergency brake application, to establish a communication between a first charged reservoir and either a second charged reservoir or a restricted communication with atmosphere whereby the time between the initiation and subsequent release of an emergency brake application on a train is respectively increased by releasing fluid under pressure from two charged reservoirs to atmosphere via one pathway until a chosen lower pressure in these reservoirs is obtained, or decreased by releasing fluid under pressure from a single charged reservoir to atmosphere via the one pathway and the restricted communication simultaneously until the chosen lower pressure is obtained in this single reservoir.

DESCRIPTION

Figure 1:
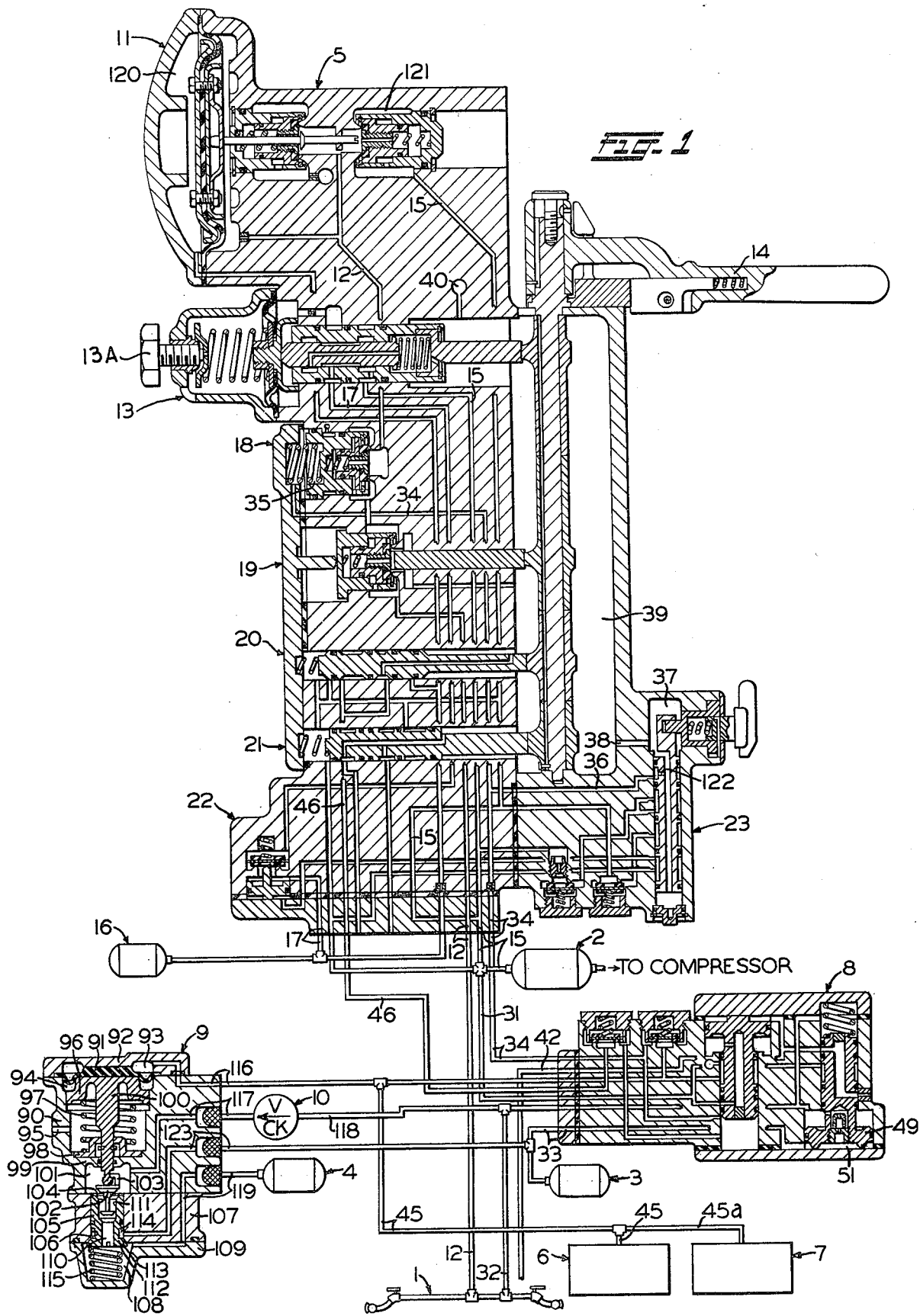
FIG. 1 is a diagrammatic view of a brake control apparatus comprising a first embodiment of the invention.

Referring to FIG. 1 of the drawings, a railway locomotive fluid pressure brake control apparatus constituting a first embodiment of the invention comprises a brake pipe 1 that extends from end to end of the locomotive and back through each car in a train hauled thereby, a main reservoir 2, a first volume reservoir 3, a second volume reservoir 4, an engineer's automatic brake valve device 5, a locomotive power supply knockout device 6, a dynamic brake cut-out switch device 7, a charging cut-off pilot valve device 8 operative upon the occurrence of an emergency brake application to supply fluid under pressure to the power knockout device 6, the dynamic brake cut-out switch device 7 and a fluid pressure operated valve device 9 for connecting the volume reservoir 4 to the volume reservoir 3, and a one-way flow valve device 10 for controlling charging of the volume reservoir 4 from the brake pipe 1 via the fluid pressure operated valve device 9.

The engineer's automtic brake valve device 5 may be of the self-lapping type such as that disclosed in U.S. Pat. No. 2,958,561 issued Nov. 1, 1960, to Harry C. May, and assigned to the assignee of the present application.

The engineer's brake valve device 5 comprises a relay valve 11 to which the brake pipe 1 is connected by a branch pipe and correspondingly numbered passageway 12, this relay valve 11 being operable in the manner described in the above-mentioned U.S. Pat. No. 2,958,561 to control variations of pressure in the brake pipe 1. The brake valve device 5 further comprises a self-lapping type regulating or control valve 13 operable in response to manual arcuate movement of a handle 14 to control the supply of fluid under pressure from the main reservoir 2, which is connected to the control valve 13 by a pipe and correspondingly numbered passageway 15, to an equalizing reservoir 16 that is connected to the delivery of this control valve 13 by a pipe and correspondingly numbered passageway 17, a brake pipe cut-off valve 18, a vent valve 19, an emergency valve 20, a suppression valve 21, an equalizing reservoir cut-off valve 22, and a manually positionable selector valve 23 for selectively conditioning the brake valve device 5 for effecting either direct release operation of the brake control valve device on each car in a train of cars hauled by a locomotive provided with the engineer's brake valve device 5, if each car is provided with a direct release type brake control valve device, or a graduated application and graduated release operation of the brake control valve device on each car if each car is provided with a graduated release type brake control valve device, for cutting out control of brake pipe pressure by the brake valve device 5 when the locomotive is not the lead or brake controlling unit in multiple-unit operation, or for conducting a brake pipe leakage test. The valves 11, 13, 18, 19, 20, 21, 22, and 23 form no part of the present invention and will not be described in detail herein.

The locomotive power supply knockout device 6 may be of any suitable construction for effecting, when operated by fluid under pressure supplied thereto, a cut-off of the supply of power to the prime mover, such as one or more electric motors, that effect propulsion of the locomotive.

Likewise, the dynamic brake cut-out switch device 7 may be of any suitable construction for effecting, when operated by fluid under pressure supplied thereto, opening of a dynamic braking circuit for the electric motors.

Figure 2:
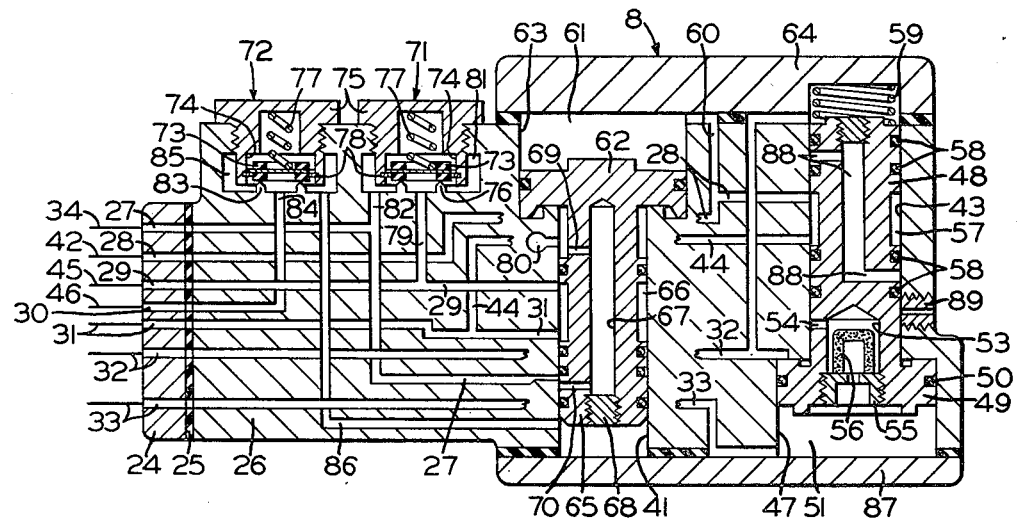
FIG. 2 is a diagrammatic sectional view showing the charging cut-off pilot valve device of FIG. 1 in its emergency position.

The charging cut-off pilot valve device 8 is shown diagrammatically in FIGS. 1 and 2 of the drawings and comprises a pipe bracket 24 that is provided on its right-hand side with a vertical bolting face 25 to which is secured by any suitable means (not shown) a casing 26.

Extending from the vertical bolting face 25 through the pipe bracket 24 are seven ports and corresponding passageways which open at the left-hand side of the pipe bracket 24. These passageways are denoted by the numerals 27, 28, 29, 30, 31, 32 and 33.

Connected to the port 27 is one end of a pipe 34 that has its opposite end connected to a correspondingly numbered passageway which extends through the brake valve device 5 and opens into a chamber 35 in the hereinbefore-mentioned brake pipe cut-off valve 18 of this brake valve device 5.

Opening into the passageway 34 within the brake valve device 5 and at a location intermediate the ends of this passageway is one end of a passageway 36 which, while the selector valve 23 occupies the position shown, is open to atmosphere via this selector valve 23, a chamber 37, a passageway 38, a chamber 39 and an exhaust passageway 40 all of which are in the brake valve device 5.

The passageway corresponding to the port 27 extends through the pipe bracket 24 and body 26 of the charging cut-off valve device 8 and opens at its other end at the wall surface of a bore 41 extending through the body 26. Opening at the wall surface of the bore 41 at a location above that at which the passageway 27 opens at this wall surface is one end of the above-mentioned passageway 31 that extends through the body 26 and pipe bracket 24 and is connected by a correspondingly numbered pipe to the pipe 15 intermediate the ends thereof, one end of this pipe 15 being connected to the main reservoir 2 (FIG. 1). This pipe 15 is connected to the correspondingly numbered passageway in the brake valve device 5 in order that, as explained in the above-mentioned U.S. Pat. No. 2,958,561, fluid under pressure may be supplied from the reservoir 2 to the relay valve device 11 and the self-lapping control valve device 13 both of which constitute a part of the brake valve device 5.

Connected to the port 28 is one end of a pipe 42 that has its opposite end connected to the usual rail sanding apparatus found on railway locomotives, this apparatus not being shown in the drawings since it forms no part of the present invention.

The passageway corresponding to the port 28 extends through the pipe bracket 24 and body 26 and opens at the wall surface of a bore 43 in the body 26 above the location at which one end of a passageway 44 opens at the wall surface of this bore. This passageway 44 extends through the body 26 and opens into the hereinbefore-mentioned passageway 31 which is connected to the main reservoir 2 in the manner explained above.

A pipe 45 that has one end connected to the port 29 has its opposite end connected to the power knockout switch device 6. The dynamic brake cut-out switch device 7 is connected to this pipe 45 by a branch pipe 45a.

The passageway corresponding to the port 29 extends through the pipe bracket 24 and the body 26 and opens at the wall surface of the bore 41 above the location at which the one end of the passageway 31 opens at this wall surface.

Connected to the port 30 is one end of a pipe 46 that is connected to a correspondingly numbered passageway in the brake valve device 5 that is normally open to atmosphere via the emergency valve 20. This passageway 46, as described in the above-mentioned U.S. Pat. No. 2,958,561, is supplied with fluid under pressure when the handle 14 of the brake valve device 5 is moved to its emergency position.

The port 32 at the left-hand side of the pipe bracket 24 is connected by a correspondingly numbered pipe to the brake pipe 1 as shown in FIG. 1. The corresponding passageway 32 extends through the casing 26 (FIG. 1) and opens at the upper end of a counterbore 47 therein that is coaxial with the bore 43 in this casing 26. Slidably mounted in the bore 43 is a spool-type valve 48 that has formed integral therewith at its lower end an actuating piston 49 which is slidably mounted in the counterbore 47.

The actuating piston 49 is provided with a peripheral annular groove in which is disposed an O-ring seal 50 that forms a seal with the wall surface of the counterbore 47 to prevent leakage of fluid under pressure between the periphery of the piston 49 and the wall of the counterbore 47 from a chamber 51 below the piston to the upper end of the counterbore 47. Opening into the chamber 51 is one end of the hereinbefore-mentioned passageway 33 that extends through the casing 26 and pipe bracket 24 and is connected by a correspondingly numbered pipe to the hereinbefore-mentioned first volume reservoir 3 (FIG. 1).

In order to provide for charging the first volume reservoir 3 from the brake pipe 1, the piston 49 and spool-type valve 48 have formed therein a bottom bore 53 the upper end of which, as viewed in FIG. 1, is open to the interior of the counterbore 47 via a short passageway 54. The lower end of the bore 53 is provided with internal screw-threads for receiving a screw-threaded choke plug 55 the size of which is such as to enable a service rate of reduction of pressure in the reservoir 3. Consequently, fluid under pressure flows from the brake pipe 1 to the first volume reservoir 3 via pipe and corresponding passageway 32, that portion of the counterbore 47 above the piston 49, short passageway 54, bottom bore 53, a strainer device 56 disposed in the bottom bore 53, choke plug 55, chamber 51, and passageway and corresponding pipe 33 until the first volume reservoir 3 is charged to the normal chosen pressure to which the brake pipe 1 is charged.

As shown in FIG. 1, the spool-type valve 48 has formed thereon an elongated peripheral annular groove 47 and adjacent each end of this groove, a pair of spaced-apart peripheral annular grooves in each of which is disposed an O-ring seal 58 that forms a seal with the wall surface of the bore 43.

When the spool-type valve 48 is moved by the piston 49, in a manner hereinafter explained, from the position shown in FIG. 1 against the yielding resistance of a spring 59 to a second position shown in FIG. 2, the groove 57 establishes a communication between the passageway 44, one end of which opens at the wall surface of the bore 43 and the passageway 28 one end of which opens at the wall surface of the bore 43 above the location at which the one end of the passageway 44 opens at the wall surface of this bore 43.

Opening into the passageway 28 intermediate the ends thereof is one end of a passageway 60 that extends through the casing 26 and opens into a chamber 61 formed between a cut-off piston 62 that is slidably mounted in a counterbore 63 coaxial with the bore 41 in the casing 26 and a cover member 64 that closes the upper ends of the bore 43 and the counterbore 63 and is secured to the casing 26 by any suitable means (not shown).

Formed integral with the cut-off piston 62 is a spool-type valve 65 that is slidably mounted in the bore 41 and has formed thereon an elongated peripheral annular groove 66. This spool-type valve 65 is further provided with a bottomed bore 67 the lower end of which is provided with internal screw threads for receiving a screw-threaded plug 68 to close the lower end of this bottomed bore. Adjacent its upper end the bottomed bore 67 is open to the interior of the counterbore 63 via a short passageway 69. Likewise, adjacent its lower end the bottomed bore 67 is open to the peripheral surface of the valve 65 via a short passageway 70 which, while the valve 65 occupies the position shown in FIG. 1, registers with the hereinbefore-mentioned one end of the passageway 31 that opens at the wall surface of the bore 41. Since the passageway 31 is connected by the correspondingly numbered pipe and the pipe 15 to the main reservoir 2 (FIG. 1), fluid under pressure flows from this reservoir to the lower face of the piston 62 via pipe 15, pipe and passageway 31, short passageway 70, bottomed bore 67, short passageway 69 and counterbore 63, and is effective to normally maintain the piston 62 and valve 65 in the position shown in FIG. 1.

The charging cut-off pilot valve device 8 further comprises a pair of spaced-apart identical check valve devices 71 and 72. Therefore, a description of one will suffice for both, it being understood that corresponding parts of the check valve device 72 have the same reference numerals as those of the check valve device 71.

Each of the check valve devices 71 and 72 comprises a flat disc valve 73 which is slidably disposed in a counterbore 74 formed in a cap nut 75 that has screw-threaded engagement with corresponding internal screw threads provided in the casing 26. The disc valve 73 of the check valve device 71 is biased toward a corresponding valve seat 76 by a spring 77 interposed between the flat disc valve 73 and the cap nut 75.

To facilitate assembly and disassembly of each cap nut 75, spring 77 and flat disc valve 73, as a unit, the spring 77 and flat disc valve 73 are retained in the counterbore 74 by a snap ring 78 that is inserted in a groove formed in the wall of this counterbore.

As shown in FIG. 2, the spring 77 of the check valve device 71 is effective to normally bias the corresponding flat disc valve 73 against the annular valve seat 76 that is formed at one end of a passageway 79 that extends through the casing 26 and opens at its opposite end into the passageway 29 intermediate the ends thereof. While the spool-type valve 65 occupies the position shown in FIG. 1, the groove 66 thereon establishes a communication between the passageway 29 and a passageway 80 that is open to atmosphere.

The cap nut 75 of the check valve device 71 cooperates with the casing 26 to form therein a chamber 81 into which opens one end of a short passageway 82 that at its opposite end opens into the hereinbefore-mentioned passageway 27 intermediate the ends thereof.

As is also shown in FIG. 2, the spring 77 of the check valve device 72 is effective to normally bias the corresponding flat disc valve 73 of this check valve device against an annular valve seat 83 that is formed at one end of a passageway 84 that extends through the casing 26 to the hereinbefore-mentioned passageway and port 30 in the pipe bracket 24, it being remembered that this port 30 is connected by the pipe 46 to the brake valve device 5 (FIG. 1) to which pipe 46, as described in the above-mentioned U.S. Pat. No. 2,958,561, fluid under pressure is supplied when the handle 14 of this brake valve device 5 is moved to its emergency position.

The cap nut 75 of the check valve device 72 cooperates with the casing 26 to form therein a chamber 85 into which opens one end of a passageway 86 that extends through the casing 26 and opens into the bore 41 therein adjacent the lower end thereof which is closed by a bottom cover member 87 that also closes the lower end of the counterbore 47 and is secured to the casing 26 by any suitable means (not shown).

While the spool valve 48 occupies the position shown in FIG. 1, one end of a passageway 88 in this spool valve 48 registers with that end of the passageway 28 that opens at the wall surface of the bore 43. The opposite end of this passageway 88 registers with a choke plug 89 that is carried by the casing 26. Consequently, while the actuating piston 49 and spool valve 48 occupy the position shown in FIG. 1, all fluid under pressure is vented from the sanding apparatus on the locomotive to atmosphere via pipe 42, port and passageway 28, passageway 88 in spool valve 48 and choke plug 89.

Moreover, fluid under pressure is vented from the chamber 61 to atmosphere at this time via passageways 60, 28 and 88, and the choke plug 89.

The fluid pressure operated valve device 9 shown in FIG. 1 comprises a casing section 90 containing a diaphragm 91 clamped about its outer periphery between the casing section 90 and a cover 92, and defining with this cover a control chamber 93. At the other side of the diaphragm 91 is a spring chamber 94 which is open to atmosphere through a passageway 95. Contained in the chamber 94 is a diaphragm follower 96 which is biased into operative contact with the diaphragm 91 by a spring 97 interposed between the diaphragm follower 96 and a hollow spring seat 98 that rests against a partition wall 99 of the chamber 94. Follower 96 has a stem 100 that extends through the hollow spring seat 98 and a central opening in the partition wall 99.

A chamber 101 is formed in the casing section 90 at the side of the partition wall 99 opposite the chamber 94 and contains a valve 102 that is linked by a means of a forked connection 103 to the lower end of the follower stem 100, as viewed in FIG. 1. The valve 102 is adapted to make seating contact with a valve seat 104 formed on the upper end of a cylindrical valve member 105 which is slidably mounted in a bore 106 formed in a casing section 107 which is secured to the casing section 90 by any suitable means (not shown). The bore 106 in the casing section 107 extends from the chamber 101 to a chamber 108 formed in another casing section 109 that is secured to the casing section 107 by any suitable means (not shown).

Figure 4:
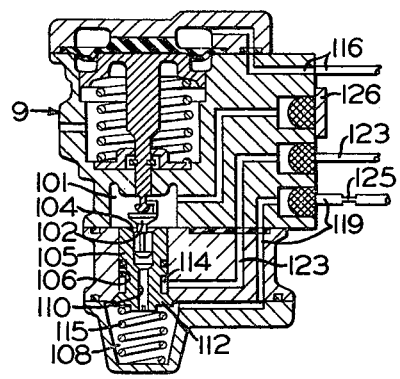
FIG. 4 shows a blowdown choke that may be used to replace one of two volume reservoirs shown in FIG. 1 to provide a brake apparatus that constitutes a second embodiment of the invention.

The valve member 105 is provided with a through bore 110 and a coaxial counterbore 111 encircled at its upper end by the valve seat 104. The lower end of the cylindrical valve member 105 is encircled by a conical or poppet-type valve 112, which is arranged for cooperation with a valve seat 113 formed on the casing section 107 at the lower end of the bore 106 to control communication between chamber 108 and a chamber 114 formed by the wall of the bore 106 and a reduced portion of the valve member 105. A spring 115 is disposed in chamber 108 and is interposed between the valve 112 and the casing section 109 for urging the valve member 105 upward to a position in which communication between chambers 101 and 108 is open via bore 110 and counterbore 111, and communication between chamber 108 and chamber 114 is closed, as shown in FIGS. 1 and 4 of the drawings.

In order that fluid under pressure may be supplied to the chamber 93 in the fluid pressure operated valve device 9 for effecting operation of this valve device, the chamber 93 is connected by a passageway and correspondingly numbered pipe 116 to the hereinbefore-mentioned pipe 45 intermediate the ends thereof.

The chamber 101 in the valve device 9 shown in FIG. 1 is connected by a passageway and correspondingly numbered pipe 117 to the outlet of the hereinbefore-mentioned one-way flow valve device 10, the inlet of this valve device 10 being connected by a pipe 118 to the pipe 32 which, as hereinbefore stated, is connected to the brake pipe 1.

Likewise, the chamber 108 in the valve device 9 shown in FIG. 1 is connected by a passageway and correspondingly numbered pipe 119 to the hereinbefore-mentioned second volume reservoir 4. Consequently, in the absence of fluid under pressure in the chamber 93 of this fluid pressure operated valve device 9, the second volume reservoir 4 can be charged from the brake pipe 1 via pipes 32 and 118, one-way flow valve device 10, pipe and passageway 117, chamber 101, past unseated valve 102, counterbore 111, bore 110, chamber 108, and passageway and pipe 119 until the pressure in this second volume reservoir 4 is substantially the same as that in the train brake pipe 1 and in the first volume reservoir 3.

OPERATION

To initially charge the brake control apparatus shown in FIG. 1 of the drawings, the diesel engines are started for operating fluid compressors (not shown) to effect charging of the main reservoir 2.

It may be assumed that the handle 14 of the engineer's automatic brake valve 5 is in its release position. Therefore, while the handle 14 is in its release position, the self-lapping control valve 13 of this brake valve 5 is effective, as explained in the above-mentioned U.S. Pat. No. 2,958,561, to supply fluid under pressure from the main reservoir 2, which is connected to this control valve 13 via pipe and passageway 15, to the equalizing reservoir 16 and an operating chamber 120 in the relay valve 11. Consequently, the relay valve 11 will operate to effect the supply of fluid under pressure from its operating chamber 121, that is also connected by a branch of the passageway 15 to the main reservoir 2, to the train brake pipe 1 until this pipe 1 is fully charged to the pressure carried therein as determined by the setting of the control valve 13.

Fluid under pressure thus supplied to the brake pipe 1 will flow therefrom to the first volume reservoir 3 via the pipe and passageway 32, counterbore 47, short passageway 54 in spool valve 48, bottomed bore 53, strainer device 56, choke plug 55, chamber 51 below actuating piston 49, and passageway and pipe 33 until this reservoir 3 is charged to the pressure carried in the brake pipe 1.

Moreover, fluid under pressure thus supplied to the brake pipe 1 will flow therefrom to the second volume reservoir 4 via the pipes 32 and 118, one-way flow valve device 10, pipe and passageway 117, chamber 101 in the fluid pressure operated valve device 9, past unseated valve 102, counterbore 111 and bore 110 in cylindrical valve member 105, chamber 108, and passageway and pipe 119 until this reservoir 4 is charged to the pressure carried in the brake pipe 1.

As explained in detail in hereinbefore-mentioned U. S. Pat. No. 2,958,561, when the handle 14 of the brake valve device 5 shown in FIG. 1 of the drawings is moved from its release position to any position in its service application zone, the relay valve 11 of this brake valve device 5 will operate to release fluid under pressure from the brake pipe 1 to atmosphere at a service rate.

As fluid under pressure is thus released from the brake pipe 1 to atmosphere at a service rate, fluid under pressure will flow from the first volume reservoir 3 to the brake pipe 1 via pipe and passageway 33, chamber 51 below piston 49, choke plug 55, strainer device 56, bottomed bore 53, short passageway 54, counterbore 47, and passageway and pipe 32 at a service rate, it being remembered that the size of the choke plug 55 is such as to provide for the flow of fluid under pressure therethrough at this service rate. Consequently, no differential of pressure is established at this time on the opposite sides of the actuating piston 49 to cause it to be shifted in an upward direction from the position in which it is shown in FIG. 1 to thereby effect operation of the charging cut-off pilot valve device 8 when a service brake application is effected.

It will be noted that the one-way flow valve device 10 prevents flow of fluid under pressure from the second volume reservoir 4 to the brake pipe 1.

Now let it be supposed that a brake pipe hose bursts or a break-in-two occurs between any two cars in the train. Upon the occurrence of a burst hose or a break-in-two, fluid under pressure will be suddenly vented from the brake pipe 1 to atmosphere at an emergency rate.

Therefore, fluid under pressure will now flow from the upper face of the actuating piston 49 (FIG. 1) of the charging cut-off pilot valve device 8 to atmosphere via the passageway and pipe 32 and the brake pipe 1 to the point of rupture at an emergency rate which is a faster rate than fluid under pressure can flow from the chamber 51 below this piston 49 through the choke plug 55 to the upper face thereof and the interior of the counterbore 47. Consequently, a differential fluid pressure force is quickly established on the actuating piston 49 which moves it and the valve 48 from the position shown in FIG. 1 against the yielding resistance of the spring 59 to an upper position in which it is shown in FIG. 1. In this upper position, the groove 57 on the valve 48 establishes a communication between the passageways 44 and 28 whereupon fluid under pressure flows from the main reservoir 2 to the chamber 61 above the cut-off piston 62 via the pipe 15, pipe and passgeways 31 (FIG. 1), passageway 44 (FIG. 2), groove 57 on valve 48, passageway 28 and passageway 60.

This supply of fluid under pressure to the chamber 61 is effective on the entire area of the piston 62 whereas fluid under pressure supplied to the lower face of this piston 62 from the passageway 31 via the short passageway 70, bottomed bore 67, short passageway 69 and counterbore 63 is effective on an area equal to the difference in the area of the piston 62 and the cross-sectional area of the valve 65. Therefore, it is apparent that a differential fluid pressure force is established on the piston 62 which is effective to move this cut-off piston 62 and the valve 65 downward from the position shown in FIG. 1 to a second position shown in FIG. 2 in which the groove 66 on this valve 65 established a communication between the passageways 31 and 29. Upon the groove 66 thus establishing a communication between the passageways 31 and 29, fluid under pressure will flow from the main reservoir 2 (FIG. 1) to the chamber 35 in the brake pipe cut-off valve 18 of the brake valve device 5 via pipe 15, pipe and passageway 31, groove 66 on valve 65 (FIG. 2) now in its second or lower position passageways 29 and 79 in the casing 26, past valve 73 of the check valve device 71, chamber 81, short passageway 82, passageways 27 and pipe and passageway 34 to cause operation of this brake pipe cut-off valve 18 to its closed position thereby preventing flow of fluid under pressure from the relay valve 11 to the brake pipe 1.

It will be noted from FIG. 1 that the passageway 34 in the brake valve device 5 is open to atmosphere via passageway 36, a restriction or choke 122 in the spool valve of the selector valve 23, chamber 37, passageway 38, chamber 39 and exhaust passageway 40. This restriction or choke 122 in the spool valve of the selector valve 23 is small enough to insure that sufficient pressure will be built up in chamber 35 to cause closing of the brake pipe cut-off valve 18 at this time.

Furthermore, some of the fluid under pressure supplied to the passageway 29 will flow through the port 29 and pipe 45 to the power knockout switch device 6 to cause cut-off of the power supply to the locomotive.

Since the dynamic brake cut-out switch device 7 is connected to the pipe 45 by the branch pipe 45a, fluid under pressure will flow from the pipe 45 to this switch device 7 via the branch pipe 45a to cause cut-out of the dynamic brake on the locomotive.

It is apparent from FIG. 1 that some of the fluid under pressure supplied to the pipe 45 in the manner described above will flow from this pipe 45 to the chamber 93 above the diaphragm 91 of the fluid pressure operated valve device 9 via the pipe and passageway 116.

When the fluid under pressure thus supplied to the chamber 93 increases sufficiently to establish a fluid pressure force that acts in a downward direction on the diaphragm 91 and is in excess of the force of the spring 97, this diaphragm 91 is deflected downward against the yielding resistance of this spring 97 to shift the stem 100 and valve 102 downward to first seat valve 102 on its seat 104 thereby closing communication between chambers 101 and 108.

Further downward deflection of the diaphragm 91 is effective, via the stem 100, forked connection 103, valve 102 and cylindrical valve member 105, to unseat the valve 112 from its seat 113.

It is apparent from FIG. 1 that, when valve 112 is thus unseated from its seat 113, the second volume reservoir 4 is connected to the first volume reservoir 3 via pipe and passageway 119, chamber 108, past unseated valve 112, bore 106, chamber 114, a passageway 123 that extends through the casing sections 109, 107 and 90 and opens at one end into the chamber 114 and has its opposite end connected by a correspondingly numbered pipe to the pipe 33 intermediate the ends thereof, and the pipe 33.

Since the pipe 33 is connected to the chamber 51 below the actuating piston 49 by the correspondingly numbered passageway 33, it is apparent that both the first volume reservoir 3 and the second volume reservoir 4 are now connected to the chamber 51 below this piston 49. Consequently, fluid under pressure will flow from the first volume reservoir 3 and also the second volume reservoir 4, now connected one to the other as explained above, to atmosphere via the pipe and passageway 33, chamber 51 (FIG. 2), choke plug 55, bottomed bore 53, strainer device 56, short passageway 54, bore 43, counterbore 47, passageway and pipe 32, brake pipe 1 and the point of rupture in the brake pipe 1. Therefore, after a chosen period of time, determined by the size of the volume reservoirs 3 and 4, substantially all of the fluid under pressure in these two volume reservoirs is vented to atmosphere, via the choke plug 55 and point of rupture in the brake pipe 1, whereupon the spring 59 (FIG. 2) is rendered effective to return the valve 48 and the actuating piston 49 to the position in which they are shown in FIG. 1.

Upon the return of the valve 48 to the position shown in FIG. 1, fluid under pressure will be released from the chamber 61 above the cut-off piston 62 to atmosphere via passageways 60 and 28, passageway 88 in the valve 48 one end of which passageway 88 registers with the passageway 28 and the opposite end of which registers with the choke plug 89, and this choke plug 89.

In order to effect a release of an emergency brake application resulting from a burst brake pipe hose or a break-in-two between any two adjacent cars in a train, the engineer must first move the handle 14 of the brake valve device 5 from whatever position it occupies to its emergency position.

As is explained in detail in hereinbefore-mentioned U.S. Pat. No. 2,958,561, when the handle 14 of the brake valve device 5 is moved to its emergency position, the emergency valve 20 of this brake valve device 5 effects the supply of fluid under pressure from the main reservoir 2 to the passageway and pipe 46.

It will be noted from FIG. 2 that the pipe 46 is connected to the port 30 in the pipe bracket 24 and that the passageway 84 extends through the casing 26 to the passageway and port 30 in this pipe bracket 24.

Accordingly, with fluid under pressure released from the chamber 61, as explained above, it is apparent that when fluid under pressure is supplied to the lower end of the bore 41, upon movement of the handle 14 of the brake valve device 5 to its emergency position, subsequent to an emergency brake application resulting from a burst hose or a break-in-two between any two adjacent cars in the train, via passageway and pipe 46, port 30, passageway 84, past disc valve 73 of check valve device 72, chamber 85 and passageway 86, this fluid under pressure acting on the lower end of the valve 65 is effective to move this valve 65 and cut-off piston 62 to their upper position shown in FIG. 1.

It will be noted that when the valve 65 and piston 62 are returned to the position shown in FIG. 1, fluid under pressure will flow from the main reservoir 2 to the lower side of the piston 62 via pipe 15, pipe and passageway 31, short passageway 70, bottomed bore 67, short passageway 69 and counterbore 63 to maintain piston 62 and valve 65 in their upper position in which they are shown in FIG. 1 upon subsequent movement of the handle 14 of the brake valve device 5 out of its emergency position to another one of its plurality of positions.

From the foregoing it is apparent that, by the provision of the second volume reservoir 4, which is connected to the first volume reservoir 3 when an emergency brake application is effected as the result of a burst hose or a break-in-two between any two cars in the train, the time before the actuating piston 49 of the charging cut-off valve device 8 can be returned to its original position in which it is shown in FIG. 1 is increased accordingly as the size or volume of this second volume reservoir 4 is increased.

Furthermore, it is apparent from FIG. 1 of the drawings that the actuating piston 49 must be returned to its original or lower position in which it is shown in FIG. 1 before fluid under pressure is released from the chamber 61 to atmosphere to allow the cut-off piston 62 and valve 65 to be returned to the position shown.

Therefore, when the handle 14 of the brake valve device 5 is moved to its emergency position, the emergency valve 20 of this brake valve device will effect the supply of fluid under pressure from the main reservoir 2 to the pipe 46 which is connected to the port 30 in the pipe bracket 24. The fluid under pressure thus supplied to this port 30 flows via the pathway described above, to the lower end of the bore 41 to move the valve 65 and cut-off piston 62 from their lower position in which they are shown in FIG. 2 to their upper position in which they are shown in FIG. 1.

While the valve 65 occupied the position shown in FIG. 2, the groove 66 thereon connected the passageway 31 to the passageway 29 in order that fluid under pressure might flow from the main reservoir 2 to the chamber 35 in the brake pipe cut-off valve 18 (FIG. 1) via pipe 15, pipe and passageway 31, groove 66, passageways 29 and 79, past disc valve 73 of check valve device 71, chamber 81, passageways 82 and 27, and pipe and passageway 34.

As shown in FIG. 1, this groove 66 on valve 65 no longer connects passageways 31 and 29. Consequently, the supply of fluid under pressure from the main reservoir 2 to the chamber 35 is cut off upon the return of the cut-off piston 62 to the position shown in FIG. 1. Therefore, the fluid under pressure in the chamber 35 of the brake pipe cut-off valve 18 will not flow to atmosphere via passageways 34 and 36, the restriction 122 in the spool valve of the selector valve 23, chamber 37, passageway 38, chamber 39 and exhaust passageway 40.

When the fluid under pressure present in the chamber 35 is thus released to atmosphere, the relay valve 11 of the brake valve device 5 can operate to effect the supply of fluid under pressure from the main reservoir 2 to the brake pipe 1 to effect charging thereof to cause a release of the emergency brake application that resulted from the burst hose or break-in-two of the train, provided, of course, that the defect that caused the emergency brake application has beem remedied.

Thus, by increasing the volume or size of the second volume reservoir 4, the time between the occurrence of an emergency brake application, as the result of a burst hose or a break-in-two between any two cars in a train, and effecting a release of this emergency brake application can be correspondingly increased as desired.

On some railroads, a locomotive, in hauling a train from one terminal to the next, will travel through both mountainous terrain and also substantially flat territory. Train operation on such railroads require that the normally charged pressure carried in the brake pipe while traveling in mountainous territory be substantially higher than that carried in this brake pipe while traveling through substantially flat country.

When a train reaches the location at which the railroad company requires that the brake pipe pressure be reduced from a specified high brake pipe pressure to a chosen lower brake pipe pressure, this reduction in brake pipe pressure will be accomplished by the engineer effecting a series of railway company prescribed service applications or emergency applications and subsequent brake releases until the chosen lower brake pipe pressure is obtained.

Figure 3:
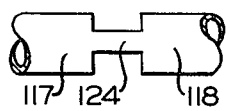
FIG. 3 shows a charging choke that may be used to replace the one-way flow charging check valve device shown in FIG. 1.

In order to adapt a locomotive provided with the brake apparatus shown in FIG. 1 for use in both mountainous terrain and substantially flat territory, the one-way flow valve device 10 is replaced by a choke 124 shown in FIG. 3, the pipes 117 and 118 that are connected to the valve device 10 in FIG. 1 being connected to this choke 124 as shown in FIG. 3.

Considering that the one-way flow valve device 10 (FIG. 1) is replaced by the shock 124 (FIG. 3) and that the adjusting screw 13A (FIG. 1) of the control valve 13 of the brake valve device 5 is adjusted to provide for a high brake pipe pressure, such as, for example, ninety or one hundred and ten pounds per square inch, for travel in mountainous terrain, fluid under pressure will flow from the brake pipe 1 to the second volume reservoir 4 via pipes 32 and 118, choke 124 (FIG. 3), pipe and passageway 117 (FIG. 1), chamber 101, past unseated valve 102, counterbore 111, bore 110, chamber 108, and passageway and pipe 119 until the pressure in this second volume reservoir is the same as that carried in the brake pipe 1.

Subsequent to passing through the mountainous terrain and upon reaching the location specified by the railway company at which the pressure carried in the brake pipe 1 is to be reduced from a certain chosen high brake pipe pressure to a specified lower brake pipe pressure, the engineer will effect a series of brake applications of the type prescribed by the railway company and subsequent brake releases. Therefore, for each brake application in the series, the engineer, by manual operation of the brake valve device 5, reduces the pressure in the brake pipe 1 a specified amount, such as, for example, from one hundred and ten pounds per square inch to ninety pounds per square inch, after which he will adjust the screw 13A of the control valve 13 of the brake valve device 5 so as to provide a higher pressure in the equalizing reservoir 16 than this reduced pressure (ninety pounds per square inch) such as, for example, one hundred pounds per square inch.

Thus, the high brake pipe pressure is reduced to the lower specified brake pipe pressure by the engineer repeatedly (1) effecting a service or an emergency brake application as specified by the particular railway company, (2) then adjusting the screw 13A of the control valve 13 so that this control valve 13 provides a chosen lower pressure in the equalizing reservoir 16 and chamber 120 of the relay valve 11, and thereafter (3) effecting a release of the previous effected brake application until the desired lower brake pipe pressure is obtained.

As the pressure in the brake pipe 1 is reduced to the desired lower brake pipe pressure in the manner described above, fluid under pressure will flow at a controlled rate from the second volume reservoir 4 to the brake pipe 1 via pipe and passageway 119, chamber 108, bore 110, counterbore 111, past unseated valve 102, chamber 101, passageway and pipe 117, choke 124 (FIG. 3), pipe 118 and pipe 32 (FIG. 1) until the pressure in the second volume reservoir 4 is reduced to that carried in the brake pipe 1 as determined by the adjustment of the adjusting screw 13A of the control valve 13 of the brake valve device 5.

It will be understood that the pressure in the first volume reservoir 3 is likewise reduced to that carried in the brake pipe 1 by flow from this reservoir 3 to the brake pipe 1 via pipe and passageway 33, chamber 51 below actuating piston 49, choke plug 55, strainer device 56, bottomed bore 53, short passageway 54, counterbore 47 above piston 49, and passageway and pipe 32.

It is apparent that when a locomotive is used to haul a short train at a slow speed, the time between effecting an emergency brake application and the complete stopping of the train is less than is the case when the locomotive is used to haul a long train at the same speed or a train of the same length at a higher speed.

Moreover, when a locomotive is used to haul a freight train wherein most or all of the empty cars are located in the front half of the train next to the locomotive, and most or all of the loaded cars are located in the other or remote half of the train, it is desirable that the locomotive be provided with means to reduce the time between the initiation of a break-in-two initiated emergency brake application and a subsequent release of this application whereby the locomotive would be rendered effective to pull the empty cars away from the loaded cars prior to excessive damage to the empty cars by the faster traveling loaded cars.

Accordingly, where it is desired that the time between initiating an emergency brake application and the subsequent release of this application be less than that provided by heretofore used locomotive brake control apparatus, a locomotive may be provided with a brake control apparatus that constitutes a second embodiment of the invention and is the same as that shown in FIG. 1 of the drawings except that the second volume reservoir 4 and the one-way flow valve device 10 shown in FIG. 1 are omitted and the pipe 119 shown in FIG. 1 is connected to one side of a choke 125, as shown in FIG. 4, the other side of this choke 125 being open to atmosphere.

Considering now this second embodiment of the invention, it will be appreciated that, when an emergency brake application is effected, as a result of a ruptured brake pipe hose or a break-in-two of the train, the charging cut-off pilot valve device 8 will operate in the same manner as hereinbefore described for the first embodiment of the invention.

Accordingly, it will be understood that when this emergency brake application occurs, the actuating piston 49, together with the spool-type valve 48, and the cut-off piston 62 together with the spool valve 65, are moved to the position in which they are shown in FIG. 2.

Consequently, as in the first embodiment of the invention, fluid under pressure will be supplied to the chamber 35 in the brake pipe cut-off valve 18 of the brake valve device 5 to cause closing of this valve 18 thereby preventing flow of fluid under pressure from the relay valve 11 to the brake pipe 1.

Furthermore, upon movement of the actuating piston 49 to the position shown in FIG. 2, the fluid under pressure in the volume reservoir 3 will flow to atmosphere via pipe and passageway 33, chamber 51 below piston 49, choke plug 55, strainer device 56, bottomed bore 53, short passageway 54, passageway and pipe 32, and the brake pipe 1 to the point of rupture therein at a rate determined by the size of choke plug 55, as in the first embodiment of the invention.

Moreover, when the cut-off piston 62 and spool valve 65 are moved to the position shown in FIG. 2, fluid under pressure will flow from the main reservoir 2 to the chamber 93 (FIG. 1) above the diaphragm 91 of the fluid pressure operated valve device 9 via the pipe 15, pipe and passageway 31, groove 66 on valve 65, passgeway and port 29, pipe 45 and pipe and passageway 116.

This supply of fluid under pressure to the chamber 93 of the valve device 9 will cause it to operate, in the manner hereinbefore described in connection with the first embodiment of the invention, to first seat valve 102 on its seat 104 and thereafter unseat valve 112 from its seat 113.

Upon unseating of valve 112 from its seat 113, fluid under pressure will flow from the volume reservoir 3 to atmosphere via pipe 33, pipe and passageway 123, chamber 114, bore 106, past unseated valve 112, chamber 108, passageway and pipe 119 and choke 125 (FIG. 4) at a rate determined by the size of this choke 125.

From the foregoing, it is apparent that fluid under pressure is now flowing from the volume reservoir 3 (FIG. 1) to atmosphere via two separate paths, one of which includes the choke plug 55 and the point of rupture in the brake pipe 1 and the other of which includes the choke 125 (FIG. 4).

Accordingly, it is apparent that the pressure in the volume reservoir 3 and the chamber 55 below the piston 49 is reduced to the pressure at which spring 43 returns piston 49 to the position shown in FIG. 1 in substantially less time than would be the case if fluid under pressure were released from this reservoir 3 to atmosphere via only the choke plug 55. Therefore, it is apparent that when the second volume reservoir 4 shown i FIG. 1 is replaced by the choke 125 shown in FIG. 4, the time between the initiation of an emergency brake application on a train and effecting a subsequent release of this emergency brake application is reduced in accordance with the size of this choke 125.

Accordingly, it is apparent that the larger the diameter of the choke 125, the shorter the time between the occurrence of an emergency brake application and the subsequent release thereof. Therefore, the size of this choke may be selected to provide the time desired.

Considering the brake apparatus presently provided on railway locomotives used by American railroads, it will be appreciated that the different embodiments of this invention enable the present time between the occurrence of an emergency brake application and a subsequent release of this emergency application to be selectively increased or decreased to meet the specific needs of any particular railroad.

Having now described the invention, what I claim as new and desire to secure by Letters Patent is:

1. For use with a locomotive brake control apparatus having a normally charged brake pipe variations of the pressure in which pipe control the application and release of brakes on the locomotive and the cars in a train hauled thereby, a brake valve device operable to control both the supply of fluid under pressure to the brake pipe to cause a brake release and the release of fluid under pressure from the brake pipe at either a service rate or an emergency rate to respectively cause a service brake application or an emergency brake application, said brake valve device comprising a relay valve for supplying fluid under pressure to said brake pipe and a brake pipe cut-off valve operable to cut off flow of fluid under pressure from said relay valve to said brake pipe, a first reservoir of a chosen volume, and fluid pressure operated valve means including a restricted communication enabling flow of fluid under pressure between said brake pipe and said first reservoir at a service rate of brake pipe reduction whereby said first reservoir is charged from said brake pipe via said restricted communication and said valve means is operable by the fluid under pressure in said first reservoir upon the release of fluid under pressure from the brake pipe only at an emergency rate, and when so operated enables flow of fluid under pressure to said brake pipe cut-off valve to cause operation thereof to cut off flow of fluid under pressure from said relay valve to said brake pipe and also the release of fluid under pressure from said first reservoir at said service rate until the pressure in said first volume reservoir is reduced to a chosen value thereby preventing an increase of pressure in said brake pipe to cause a brake release prior to the reduction of the pressure in said first reservoir to said chosen value, wherein the improvement comprises:
   a. means for controlling the rate of reduction of the pressure in said first reservoir, and
   b. a fluid pressure operated valve device operated by fluid under pressure supplied thereto upon operation of said fluid pressure operated valve means in response to the release of fluid under pressure from said brake pipe at only an emergency rate for rendering effective said means for controlling the rate of reduction of the pressure in said first reservoir.

2. The combination, as recited in claim 1, further characterized in that said means for controlling the rate of reduction of the pressure in the first volume reservoir comprises:
   a. a second reservoir of a chosen volume, and said fluid pressure operated valve device is operative by fluid under pressure from a first position, in which said second reservoir is charged with fluid under pressure via said valve device, to a second position in which charging of second reservoir is cut off and said second reservoir is connected to said first reservoir via said valve device whereby the operation of said fluid pressure operated valve means in response to the release of fluid under pressure from the brake pipe at an emergency rate enables fluid under pressure to be simultaneously released from both of said reservoirs at said service rate until the pressure in both of said volume reservoirs is reduced to said chosen value thereby preventing an increase of pressure in said brake pipe to cause a brake release prior to the reduction of the pressure in both of said volume reservoirs to said chosen value, said second reservoir thus being effective to increase the time between the occurrence of an emergency brake application and a subsequent release thereof.

3. The combination, as recited in claim 1, further characterized in that said means for controlling the rate of reduction of the pressure in said first volume reservoir comprises:
   a. a choke of a chosen size, and said fluid pressure operated valve device is operative by fluid under pressure from a first position in which a communication between said choke and said first volume reservoir is closed to a second position in which said communication is open via said valve device whereby the operation of said fluid pressure operated valve means in response to the release of fluid under pressure from the brake pipe at an emergency rate enables fluid under pressure to be released from the first volume reservoir to atmosphere via said choke simultaneously as fluid under pressure is released from said first volume reservoir at said service rate of brake pipe reduction until the pressure in said first volume reservoir is reduced to said chosen value thereby preventing an increase of pressure in said brake pipe to cause a brake release prior to the reduction of the pressure in said first volume reservoir to said chosen value, said choke thus being effective to decrease the time between the occurrence of an emergency brake application and a subsequent release thereof.

4. The combination, as recited in claim 2, further characterized in said second reservoir is charged with fluid under pressure from the brake pipe.

5. The combination, as recited in claim 2, further characterized by a one-way flow valve means for controlling charging of said second volume reservoir.

6. The combination, as recited in claim 2, further characterized by choke means controlling charging of said second reservoir.

7. The combination, as recited in claim 2, further characterized by a one-way flow valve means for controlling charging of said second volume reservoir with fluid under pressure from the brake pipe.

8. The combination, as recited in claim 2, further characterized by choke means controlling the rate of charging of said secod reservoir with fluid under pressure from said brake pipe, said choke means enabling a controlled rate of flow of fluid under pressure from said second reservoir to said brake pipe upon effecting a change of the fully charged brake pipe pressure from a chosen high brake pipe pressure to a chosen lower brake pipe pressure.

9. The combination, as recited in claim 2, further characterized in that the chosen volume of said first volume reservoir is less than the volume calculated to cause operation of said fluid pressure operated valve means in response to flow of fluid under pressure from said first reservoir to said brake pipe at said service rate of brake pipe reduction.

10. The combination, as recited in claim 2, further characterized in that the combined volumes of said first and second reservoirs is equal to or greater than the volume calculated to cause operation of said fluid pressure operated valve means in response to flow of fluid under pressure from said first volume reservoir to said brake pipe at said service rate of brake pipe reduction thereby necessitating connecting said second reservoir to said first reservoir only upon operation of said fluid pressure operated valve means in response to the release of fluid under pressure from said brake pipe at an emergency rate.

* * * * *